United States Patent
Sesumi

(10) Patent No.: US 8,042,173 B2
(45) Date of Patent: Oct. 18, 2011

(54) SEMICONDUCTOR DEVICE WITH HIGH SECURITY HAVING JTAG PORTS

(75) Inventor: Kazunari Sesumi, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 964 days.

(21) Appl. No.: 11/964,365

(22) Filed: Dec. 26, 2007

(65) Prior Publication Data

US 2008/0163362 A1    Jul. 3, 2008

(30) Foreign Application Priority Data

Dec. 28, 2006   (JP) .................................. 2006-355089

(51) Int. Cl.
    *G06F 21/00*   (2006.01)
(52) U.S. Cl. ............... 726/17; 726/16; 726/19; 713/183
(58) Field of Classification Search .................. 713/183
    See application file for complete search history.

(56) References Cited

U.S. PATENT DOCUMENTS

| | | | |
|---|---|---|---|
| 5,226,080 A * | 7/1993 | Cole et al. ..................... | 713/183 |
| 5,606,615 A * | 2/1997 | Lapointe et al. .............. | 713/185 |
| 5,719,941 A * | 2/1998 | Swift et al. .................... | 713/155 |
| 6,523,099 B1 * | 2/2003 | Namekawa .................... | 711/163 |
| 6,996,721 B2 * | 2/2006 | Gentile .......................... | 713/190 |
| 7,509,250 B2 * | 3/2009 | Cruzado et al. ................ | 703/28 |
| 2003/0023871 A1 * | 1/2003 | Gnanasabapathy et al. .. | 713/200 |
| 2003/0101354 A1 * | 5/2003 | Okabe et al. .................. | 713/200 |
| 2006/0288230 A1 * | 12/2006 | Crall et al. .................... | 713/183 |

FOREIGN PATENT DOCUMENTS

| | | |
|---|---|---|
| JP | 2002-032267 | 1/2002 |
| JP | 2002-183108 | 6/2002 |

* cited by examiner

*Primary Examiner* — Ponnoreay Pich
(74) *Attorney, Agent, or Firm* — Studebaker & Brackett PC; Donald R. Studebaker

(57) ABSTRACT

A semiconductor device includes JTAG ports receiving integrally command information representing a command and password information representing a password, a processor for performing a process in response to the command, an output port outputting consequence information representing a consequence of the process, a transfer section for transferring the command to the processor and for transferring the consequence information to the output port, and a cut off section. The cutoff section cuts off at least one of transferring the command information to the processor and transferring the consequence information to the output port when the password does not match a predetermined proper password. Thus, the semiconductor device can advantageously heighten its security effect.

1 Claim, 6 Drawing Sheets

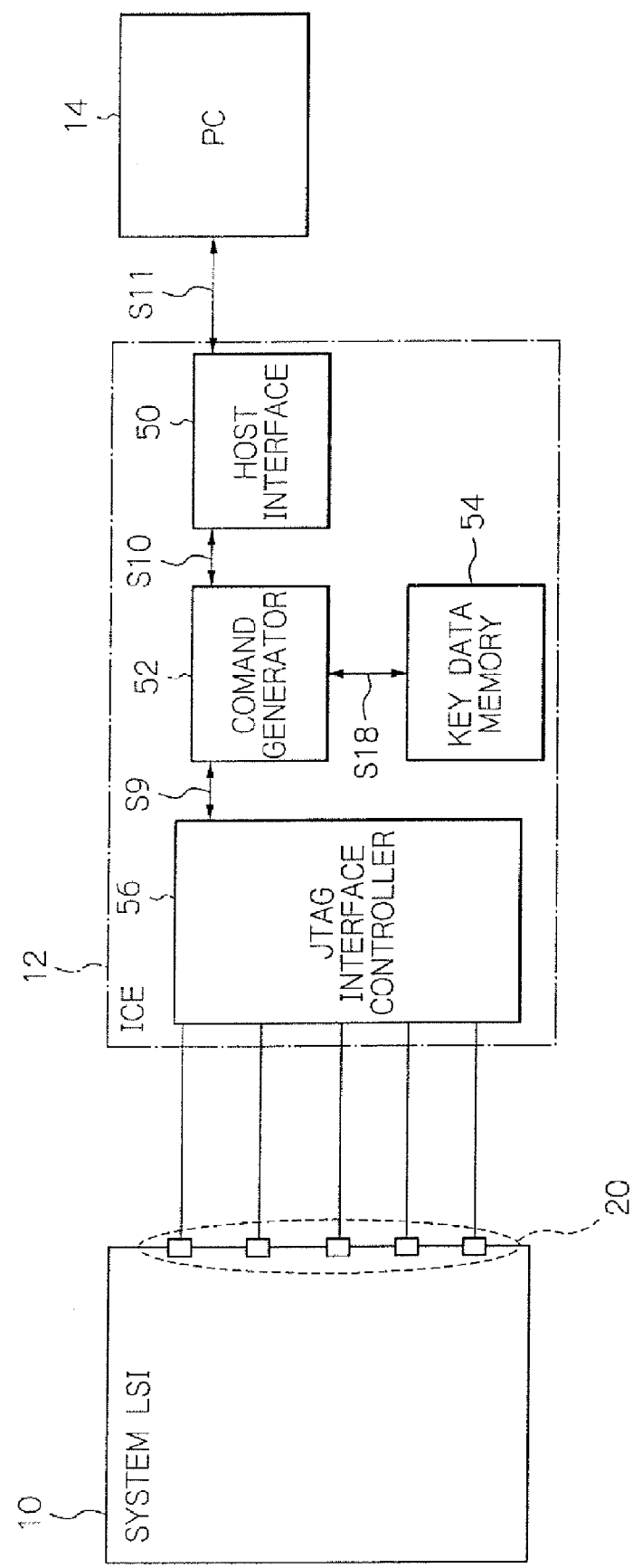

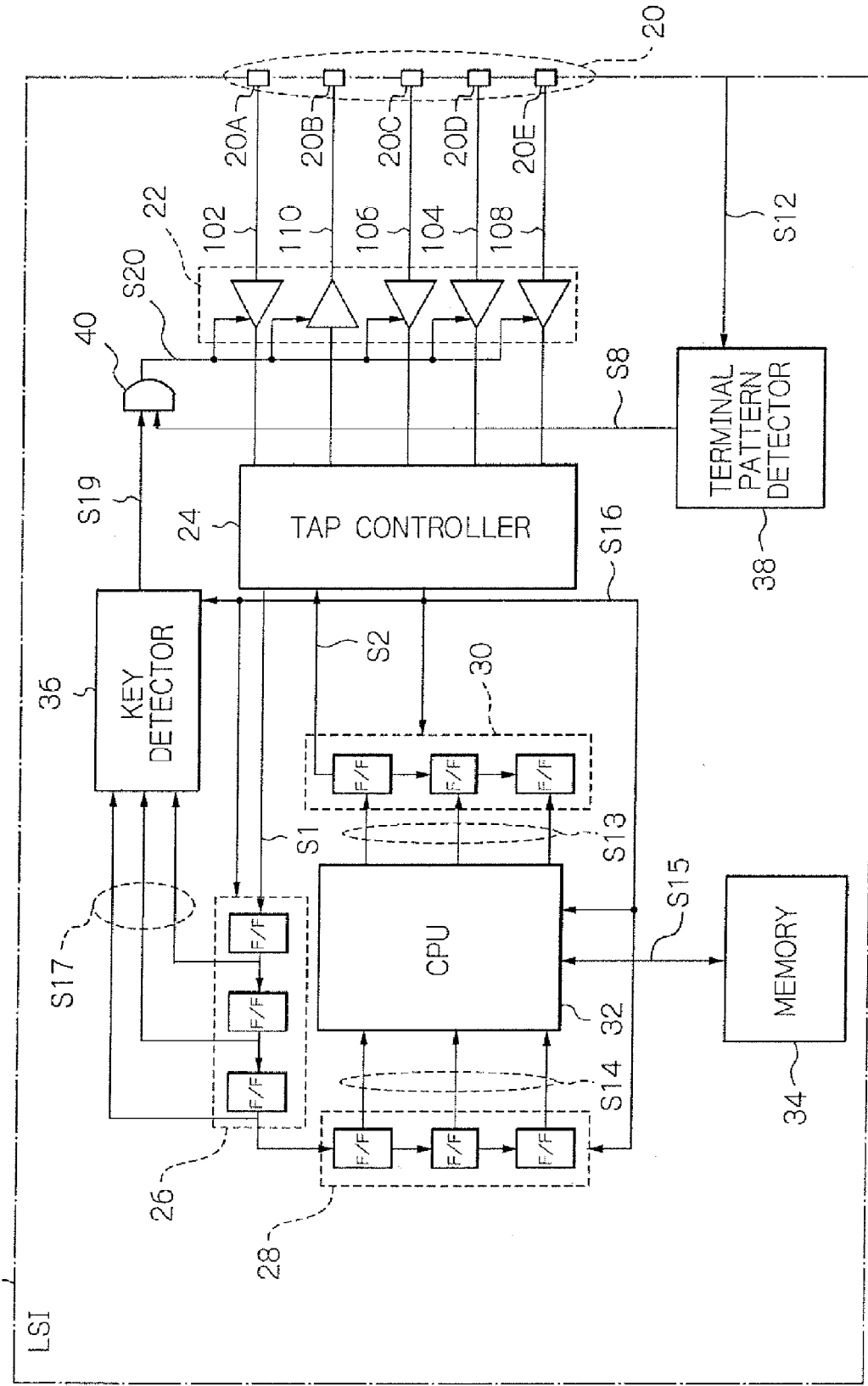

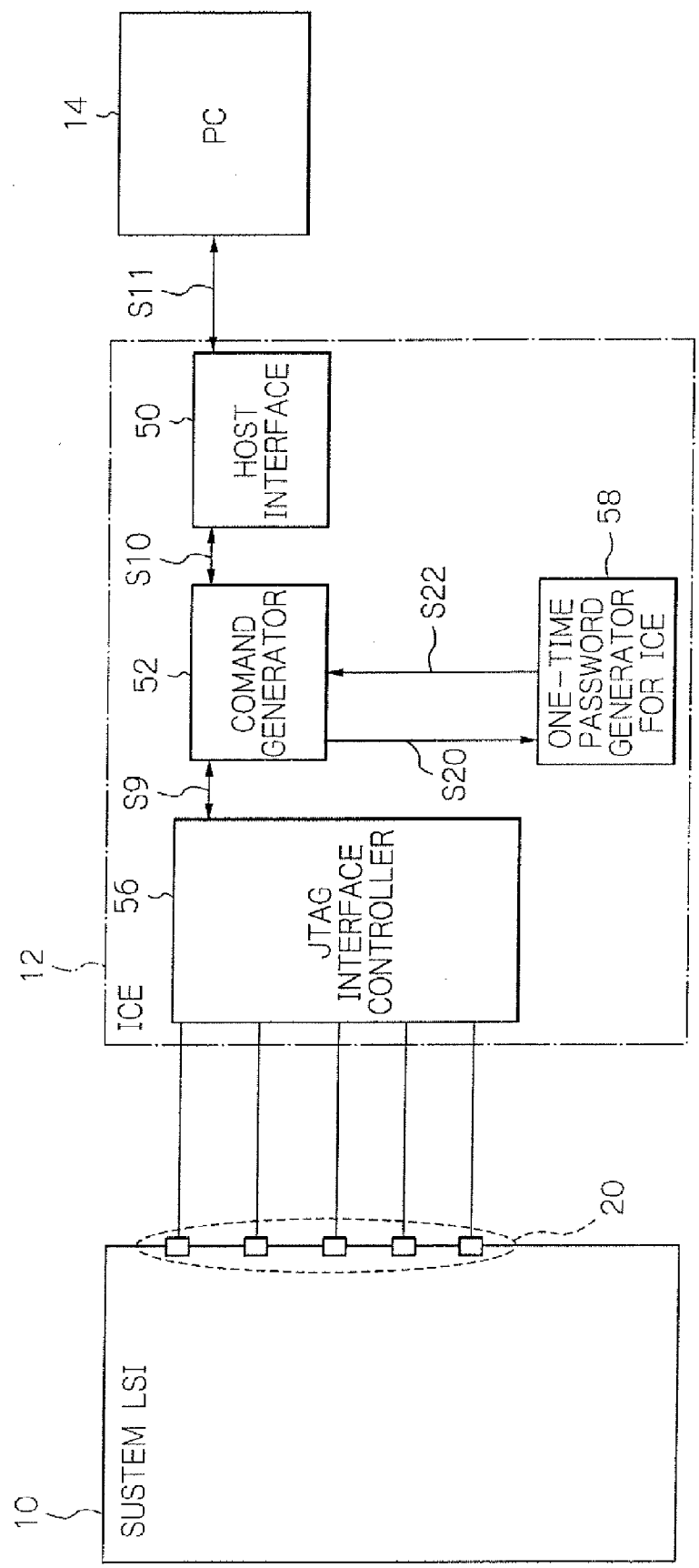

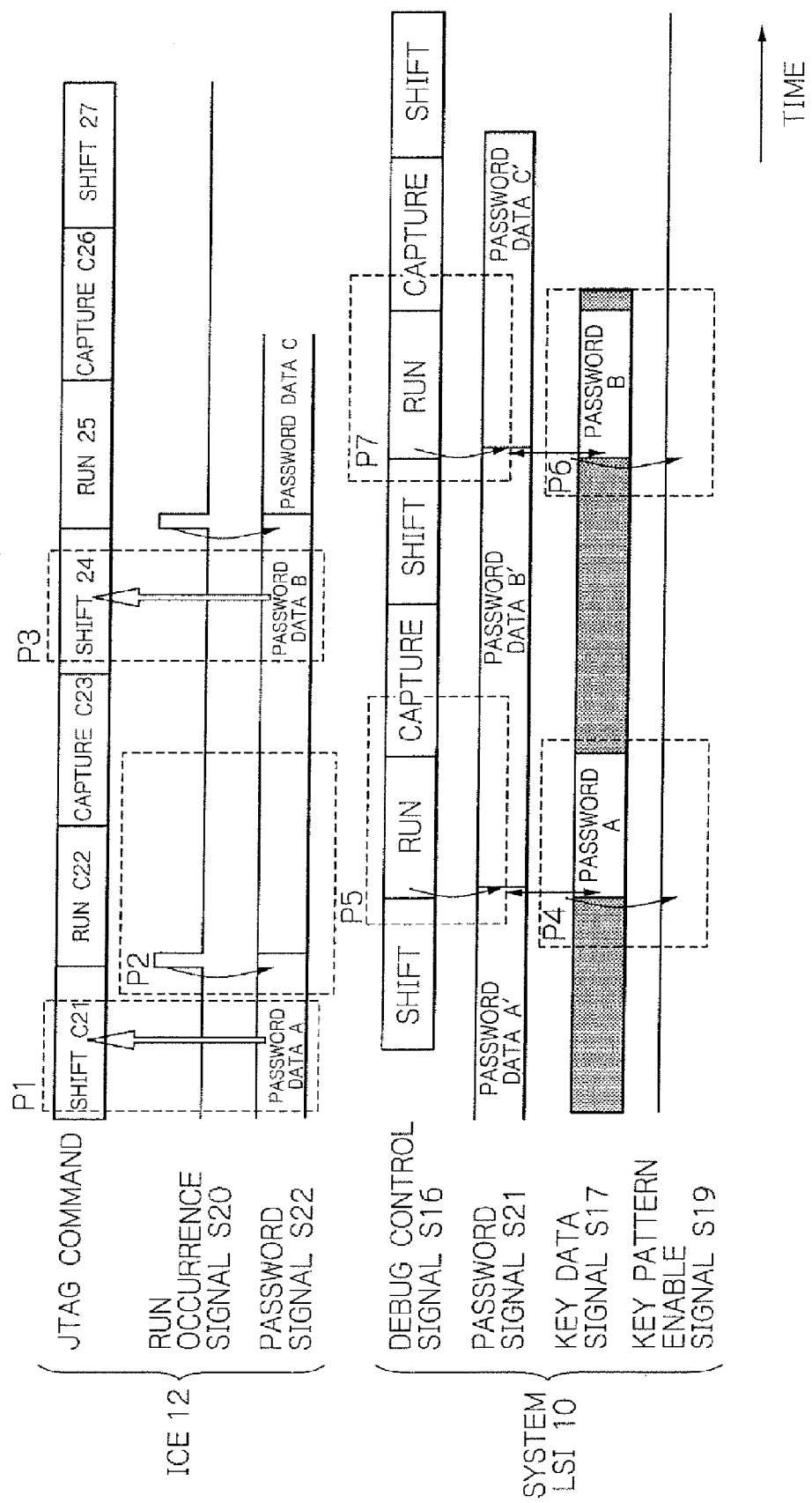

SEMICONDUCTOR DEVICE WITH HIGH SECURITY HAVING JTAG PORTS

BACKGROUND OF THE INVENTION

1. Field of the Invention

The present invention relates to a semiconductor device having a JTAG (Joint Test Action Group) port.

2. Description of the Background Art

In recent years, some of semiconductor devices such as a system LSI (Large Scale Integration) have JTAG ports as interfaces for connecting inspection devices. The semiconductor devices are also provided with memories such as a flash ROM (Read-Only Memory) in their inside that have security bits so that the security bits prevent program sequences stored in memories from being read out and rewritten through their JTAG ports.

In this kind of semiconductor device, when its security bit is enabled, access from its JTAG port to its inside is cut off so as to prevent programs stored in a memory from being read out and rewritten.

Well, even if the semiconductor device switches the security bit to its enabled state after writing a finished program, the program may need to rewritten due to the discovery of a bug or change in its specifications.

However, in this kind of semiconductor device, when the security bit is enabled and the access from its JTAG port to its inside is cut off, it may be disadvantageous that the semiconductor device must be abandoned, and that, according to circumstances, a whole apparatus including the semiconductor device must be replaced.

Japanese Patent No. 3760087 discloses a semiconductor device that enables access from its JTAG port to its inside in spite of a state that its security bit is enabled. The semiconductor device in the Japanese patent is provided with general-purpose ports. In the semiconductor device, when an input state resultant from decoding the state on one or more of the general-purpose ports matches a predetermined pattern, access from its JTAG port to its inside is enabled.

A microcomputer disclosed in the Japanese patent laid-open publication No. 2002-183108 enables access from its JTAG port to its inside in spite of a state that its security bit is enabled when data having a predetermined pattern is inputted to the JTAG port.

According to the Japanese patent and laid-open publication described above, even if a security bit is enabled, access from the JTAG port of the device to the inside allows rewriting the security bit to be disabled so that a program sequence stored in its inside can be read out and rewritten.

However, in the Japanese patent and laid-open publication described above, it is disadvantageous to not necessarily heighten security effect because access from the JTAG port to the inside allows a program sequence to be read out and rewritten when the security bit is disabled.

SUMMARY OF THE INVENTION

It is an object of the present invention to provide a semiconductor device that can heighten the security effect.

In accordance with the present invention, a semiconductor device comprises an input port to which command information representing a command and password information representing a password is integrally inputted, a processor operative in response to the command represented by the command information inputted for performing a process to produce consequence information representative of the consequence of the process, an output port outputting the consequence information, a transfer section for transferring the command information from the input port to the processor and for transferring the consequence information from the processor to the output port, and a cutoff section for cutting off at least one of transferring the command information to the processor and transferring the consequence information to the output port when the password represented by the password information inputted does not match a predetermined proper password.

In accordance with the invention, the input port receives the command information representing the command and the password information representing the password integrally, the processor is operative in response to the command represented by the command information inputted to the input port to perform the process to produce the consequence information as its performance consequence, the output port outputs the consequence information representing the performance consequence of the process by the processor, and the transfer section transfers the command information inputted to the input port to the processor and transfers the consequence information from the processor to the output port.

When the password represented by the password information inputted to the input port does not match the predetermined proper password, the cutoff section cuts off at least one of transferring the command information to the processor and transferring the consequence information to the output port.

Thus, the command information representing the command and the password information representing the password are inputted integrally to the input port, and at least one of transferring the command information to the processor and transferring the consequence information to the output port are cut off when the password represented by the inputted password information does not match the predetermined proper password. The semiconductor device in accordance with the invention can therefore advantageously heighten its security effect.

In accordance with an aspect of the invention, the semiconductor device may further comprise a generator for producing a new password at a predetermined timing, and a comparator for comparing the password represented by the password information inputted with the password produced by the generator.

In accordance with another aspect of the invention, the predetermined timing may be defined as time when the processor performs the process in response to a predetermined command.

As stated above, in accordance with the semiconductor device according to the present invention, the command information representing the command and the password information representing the password are integrally inputted to the input port. The processor in the semiconductor device performs processes in response to the command represented by the command information to produce the consequence information as its performance consequence. When the password represented by the inputted password information does not match the predetermined proper password, the semiconductor device cuts off at least one of transferring the command information to the processor and transferring the consequence information to the output port. The semiconductor device can therefore advantageously heighten its security effect.

BRIEF DESCRIPTION OF THE DRAWINGS

The objects and features of the present invention will become more apparent from consideration of the following detailed description taken in conjunction with the accompanying drawings in which:

FIGS. 1A and 1B are a schematic block diagram showing an illustrative embodiment of the system LSI and the In-Circuit Emulator in accordance with the present invention;

FIGS. 3A and 3B are a schematic block diagram showing an alternative embodiment of the system LSI and the In-Circuit Emulator in accordance with the present invention; and FIG. 4 is a timing diagram useful for understanding a variation of the JTAG command during reading twice data from the memory in the alternative embodiment.

DESCRIPTION OF THE PREFERRED EMBODIMENTS

Figure 2:
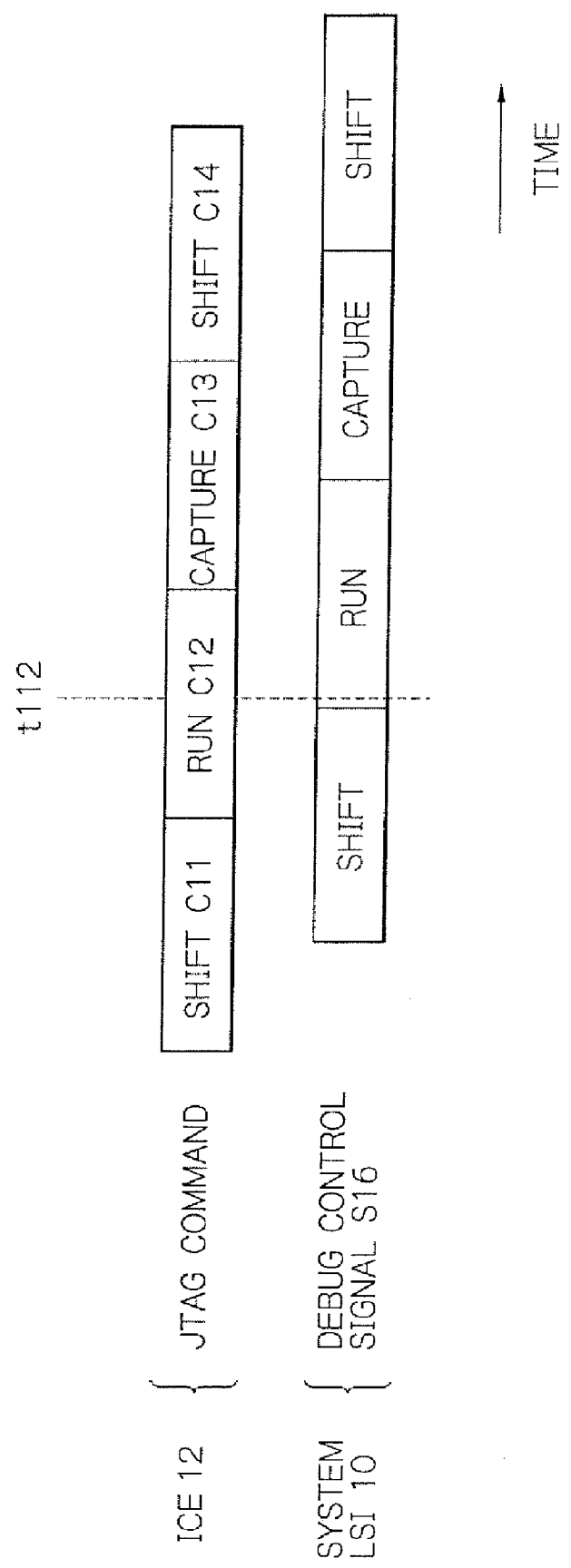
FIG. 2 is a timing diagram useful for understanding a variation of the JTAG command during reading once data from the memory in the embodiment.

With reference to the accompanying drawings, a preferred embodiment of a semiconductor device according to the present invention will be described in detail. Also, it is noted that in the following description the semiconductor device is applied to a system LSI (Large Scale Integration) 10.

As shown in FIG. 1A, the system LSI 10 in the embodiment is connected to an ICE (In-Circuit Emulator) 12 that is an inspection device inspecting the system LSI 10.

As shown in FIG. 1B, the system LSI 10 includes a JTAG (Joint Test Action Group) port 20, an input/output tri-state circuit 22, a TAP (Test Access Port) controller 24, a key data cell 26, an input data cell 28, an output data cell 30, a CPU (Center Processing Unit) 32, a memory 34r a key detector 36, a terminal pattern detector 38, and a dual-input/single-output AND gate 40, which are interconnected as illustrated.

The system LSI 10 is connected to an ICE 12 through the JTAG port 20. The JTAG port 20 is adapted to receive or output JTAG signals 102-110, and comprised of five JTAG port terminals 20A-20E. The system LSI 10 is adapted to receive an input data signal (TDI) 102, a clock signal (TCK) 104, a mode select signal (TMS) 106, and a reset signal (TRST) 108 vie the terminals 20A-20D, and output an output data signal (TDO) 110 vie the terminal 20E, as JTAG signals The JTAG port 20 is connected to the TAP controller 24 through the input/output tri-state circuit 22.

The input/output tri-state circuit 22 is configured to receive an enable signal S20 described below on its control terminal, and to control input/output and cutoff of the JTAG signals 102-110 in response to the enable signal S20.

The TAP controller 24 controls the operation of the entire LSI 10 in response to a JTAG command represented by the JTAG signals 102-108 inputted on the JTAG port 20, and controls to output a signal 110 from the inside of the LSI 10 from the JTAG port 20. The TAP controller 24 in accordance with the embodiment develops the inputted TDI signal 102 as an inside TDI signal S1. In addition, the TAP controller 24 outputs a debug control signal S16 corresponding to the JTAG command represented by the inputted TMS signal 106. The debug control signal S16 represents commands of "capture", "shift", and "run" corresponding to a JTAG capture command, a JTAG shift command, and a JTAG run command, respectively, by a value represented by the debug control signal S16.

The key data cell 26, the input data cell 28, and the output data cell 30 in accordance with the embodiment include responsive serial connections, each of which includes a plurality (three in the embodiment) of flip-flop circuits (F/Fs). The key data cell 26, the input data cell 28, and the output data cell 30 are also connected to the TAP controller 24 to receive the debug control signal S16.

The flip-flop circuit at the first stage of the key data cell 26 has its input terminal connected to the TAP controller 24 to receive the inside TDI signal S1. The flip-flop circuit at the final stage of the key data cell 26 has its output terminal connected to an input terminal of the flip-flop circuit at the first stage of the input data cell 28. Each of the flip-flop circuits in the key data cell 26 has its output terminal connected to an input terminal of the key detector 36.

In the key data cell 26, when the inputted debug control signal S16 represents "shift", each flip-flop circuit shifts data latched by itself to output the data to the stage subsequent thereto and latch data inputted from the stage preceding thereto. Thus, the key data cell 26 shifts data inputted on the inside TDI signal S1 to transfer the data in the flip-flop circuits in order, and outputs the data from the flip-flop circuit at the final stage to the input data cell 28 every time the debug control signal S16 of "shift" is inputted.

In addition, in the key data cell 26, when the inputted debug control signal S16 represents "run", each flip-flop circuit outputs the data latched by itself to the key detector 36 as a key data signal S17.

As stated above, the input terminal of the flip-flop circuit at the first stage of the input data cell 28 is connected to the output terminal of the flip-flop circuit at the final stage of the key data cell 26 to receive data outputted from the key data cell 26. Each of the flip-flop circuits in the input data cell 28 has its output terminal connected to the CPU 32.

In the input data cell 28, when the inputted debug control signal S16 represents "shift", each flip-flop circuit shifts data latched by itself to output the data to the stage subsequent thereto and latch data inputted from the stage preceding thereto.

In addition, in the input data cell 28, when the inputted debug control signal S16 represents "run", each flip-flop circuit outputs the data latched by itself to the CPU 32 as a debug input signal S14.

The CPU 32 is connected to the TAP controller 24 to receive the debug control signal S16. The CPU 32 is connected to the memory 34 via a bus S15.

The CPU 32, when the inputted debug control signal S16 represents "run", interprets a command represented by the debug input signal S14 inputted from the input data cell 28 to read out or write data from or to the memory 34 depending upon a result of the interpreting. The CPU 32 outputs data thus read out from the memory 34 as a debug output signal S13.

Each of the flip-flop circuits in the output data cell 30 has its input terminal connected to the CPU 32 to receive the debug output signal S13 outputted from the CPU 32. The flip-flop circuit at the final stage of the output data cell 30 has its output terminal connected to the TAP controller 24.

In the output data cell 30, when the inputted debug control signal S16 represents "capture", each flip-flop circuit latches the debug output signal S13 outputted from the CPU 32.

In addition, in the output data cell 30, when the inputted debug control signal S16 represents "shift", each flip-flop circuit shifts data latched by itself to output the data to the stage subsequent thereto and latch data inputted from the stage preceding thereto. Thus, the key data cell 26 shifts data latched by each flip-flop circuit in order, and outputs the data from the flip-flop circuit at the final stage to the TAP controller 24 as an inside TDO signal S2 every time the debug control signal S16 of "shift" is inputted.

The terminal pattern detector 38 receives a pattern input terminal signal S12 representing the input state of a predetermined general-purpose port, not shown. The terminal pattern detector 38, when powered on for driving, compares the input state of the general-purpose port represented by the pattern input terminal signal S12 with a pattern stored in advance. If the result of the comparison shows the input state being matched with the predetermined pattern, then a terminal pattern enable signal S8 is switched to its assert state. Otherwise, the terminal pattern enable signal S8 is switched to its negate state.

The key detector 36 is connected to the TAP controller 24 to receive the debug control signal S16.

The key detector 36 is adapted to output a key pattern enable signal S19, and enable the key pattern enable signal S19 to be asserted when the key detector 36 is powered on for driving.

The key detector 36, when the inputted debug control signal S16 represents "run", compares information represented by the key data signal S17 inputted from the key data cell 26 with an appropriate password stored in advance. If the result of the comparing indicates the information not matching with the predetermined password, then the key pattern enable signal S19 is switched to its negate state. Once the key pattern enable signal S19 is switched to its negate state, the key detector 36 holds the negate state while the power for driving is supplied.

Thus, once the key pattern enable signal S19 is switched to its negate state, it is not switched to its assert state until the supply of the power for driving stops.

The AND gate 40 has its one input terminal connected to the terminal pattern detector 38, and its other input terminal connected to the key detector 36. The key pattern enable signal S19 and the terminal pattern enable signal S8 are inputted to the respective input terminals.

The AND gate 40 outputs a signal resultant from the AND of the key pattern enable signal S19 and the terminal pattern enable signal S8 to the elements of the input/output tri-state circuit 22 in the form of enable signal S20. The enable signal S20 is switched to its assert state when both the key pattern enable signal S19 and the terminal pattern enable signal S8 are the assert state thereof. By contrast, the enable signal S20 is switched to its negate state when at least one of the key pattern enable signal S19 and the terminal pattern enable signal S8 is its negate state.

Now, returning to FIG. 1A, the ICE 12 in accordance with the embodiment includes a host interface 50, a command generator 52, a key data memory 54, and a JTAG interface controller 56, which are interconnected as illustrated.

The host interface 50 is connected to, and serves to interface with, a host device 14, such as a personal computer (PC), which controls the operation of the ICE 12. The personal computer 14 outputs various commands to the host interface 50 in order to control an inspection for the system LSI 10, and receives data inside the LSI 10 through the host interface 50.

The key data memory 54 stores beforehand password data representing a password to be attached to data when the system LSI 10 is tested.

The command generator 52 is connected to the host interface 50, the key data memory 54, and the JTAG interface controller 56 to receive various commands in order to control the inspection for the system LSI 10 from the host interface 50.

The command generator 52 interprets a command inputted from the personal computer 14 through the host interface 50, converts the command to a corresponding JTAG command, attaches the password data stored in the key data memory 54 to the JTAG command, and outputs the resultant data to the JTAG interface controller 56. The command generator 52 is also adapted to receive data inputted from the JTAG interface controller 56, and output the data to the personal computer 14 through the host interface 50.

The JTAG interface controller 56 outputs a JTAG shift command generated by the command generator 52 to the JTAG port 20. The JTAG interface controller 56 also receives data inputted on the JTAG port 20, and outputs the data to the command generator 52.

Next, the operation of the system LSI 10 in accordance with the embodiment will be described. The following will be directed to an exemplified case where the personal computer 14 reads out once a piece of data stored in the memory 34 provided for the system LSI 10.

When the system LSI 10 in accordance with the embodiment reads out data through the JTAG port 20, the system LSI 10 handles the input state of the predetermined general-purpose port as a predetermined pattern at the start of supplying the system LSI 10 with the power for driving.

When the power for driving starts being supplied to the system LSI 10, the key detector 36 switches the key pattern enable signal S19 to its assert state.

When the terminal pattern detector 38 starts being supplied with the power for driving, the pattern detector 38 reads out the pattern input terminal signal S12 to compare the input state of the general-purpose port represented by the pattern input terminal signal S12 with the predetermined pattern stored. As a result of the comparing, if the input state and the predetermined pattern are matched with each other, then the terminal pattern enable signal S8 is switched to its assert state, whereas, otherwise, the terminal pattern enable signal S8 is switched to its negate state. When the terminal pattern enable signal S8 turns to its negate state, the JTAG port 20 becomes disabled because the enable signal S20 outputted from the AND gate 40 turns to its negate state.

That prevents a user who does not know the pattern of the predetermined general-purpose port to enable the JTAG port 20 from accessing the inside of the system LSI 10.

When the JTAG port 20 is enabled, the personal computer 14 outputs a read command for directing the host interface 50 to read out once data from the memory 34.

In the ICE 12, the command generator 52 interprets a command inputted from the host interface 50, generates the JTAG signals for performing the command, and outputs the JTAG signals in order. The ICE 12 in accordance with the embodiment also outputs the JTAG command, e.g. as shown in FIG. 2 in the order a JTAG shift command C11, a JTAG run command C12, a JTAG capture command C13, and a JTAG shift command C14, so as to read out data from the memory 34 once. The ICE 12 outputs the TMS signal 106 representing the JTAG shift command C11, and attaches the password data representing the password stored in the key data memory 54 to the end of the data representing the read command to the CPU 32 to output the TDI signal 102.

In the TAP controller 24, when the TMS signal 106 representing the JTAG shift command C11 is inputted through the input/output tri-state circuit 22, the TDI signal 102 inputted through the tri-state input/output circuit 22 is outputted as the inside TDI signal S1, and the debug control signal S16 representing "shift" in sync with outputting the inside TDI signal S1 the same number of times as the flip-flop circuits included in the key data cell 26 and the input data cell 28.

Thus, data represented by the inside TDI signal S1 is shifted to the key data cell 26 and the input data cell 28 in order.

After the shifting is finished, each flip-flop circuit in the key data cell 26 latches data representing the password, and each flip-flop circuit in the input data cell 28 latches data representing the read command to the CPU 32.

Next, the ICE 12 outputs the TMS signal 106 representing the JTAG run command C12.

In the TAP controller 24, when the TMS signal 106 representing the JTAG run command C12 is inputted through the input/output tri-state circuit 22, the debug control signal S16 representing "run" is outputted.

Thus, data latched by each flip-flop circuit in the input data cell 28 is outputted as the debug input signal S14 to the CPU 32, and data latched by each flip-flop circuit in the key data cell 26 is outputted as the key data signal S17 to the key detector 36.

The CPU 32 interprets a command represented by data inputted from the input data cell 28, reads out data from the memory 34 depending upon a result of the interpreting, and outputs the read out data as the debug output signal S13.

The key detector 36 compares the password represented by the key data signal S17 with the preliminarily stored proper password, e.g. at the timing of t112 as shown in FIG. 2, and switches the key pattern enable signal S19 to its negate state when the passwords do not match each other.

Thus, when the passwords do not match each other, the key pattern enable signal S19 outputted from the key detector 36 turns to its negate state. As a result, the input/output tri-state circuit 22 becomes disabled to cut off the JTAG port 20 because the enable signal S20 outputted from the AND gate 40 turns to its negate state.

Once the key pattern enable signal S19 outputted from the key detector 36 is switched to its negate state, the signal S19 holds its negate state until the system LSI 10 is powered off. Therefore, subsequent data of the JTAG signals from the ICE 12 is not transferred to the inside of the system LSI 10, the TDO signal 110 turns to its high-impedance state, and the inside TDO signal S2 cannot be outputted.

When the key data signal S17 matches the predetermined proper password stored, the enable signal S20 outputted from the AND gate 40 holds its assert state because the key pattern enable signal S19 holds its assert state.

Next, the ICE 12 outputs the TMS signal 106 representing the JTAG capture command C13.

In the TAP controller 24, when the TMS signal 106 representing the JTAG capture command C13 is inputted through the input/output tri-state circuit 22, the debug control signal S16 representing "capture" is outputted.

Thus, the output data cell 30 latches the debug output signal S13.

Next, the ICE 12 outputs the TMS signal 106 representing the JTAG shift command C14.

In the TAP controller 24, when the TMS signal 106 representing the JTAG shift command C14 is inputted through the input/output tri-state circuit 22, the debug control signal S16 representing "shift" is outputted the same number of times as the flip-flop circuits included in the output data cell 30.

Thus, data latched by each flip-flop circuit in the output data cell 30 is outputted on one hand as the inside TDO signal S2 to the TAP controller 24, and outputted on the other hand as the TDO signal 110 to the ICE 12 through the TAP controller 24.

The ICE 12 outputs the TDO signal 110 to the personal computer 14 in the form of host interface signal S11.

As stated above, in the system LSI 10 according to the embodiment, the command information representing the command and the password information representing the password are integrally inputted to the JTAG port 20. The CPU 32 performs processing in response to the command represented by command information to produce the consequence information as a performance consequence. When the password represented by inputted password information does not match the predetermined proper password, the input/output tri-state circuit 22 cuts off transferring the command information to the CPU 32 and transferring the consequence information to the JTAG port 20. The system LSI 10 can therefore heighten advantageously its security effect.

FIG. 3A shows the system LSI 10 and the ICE 12 of an alternative embodiment of the present invention. In the following description, like components or constituent elements are designated with the same reference numerals and the repetitive descriptions will be omitted.

Figure 3B:
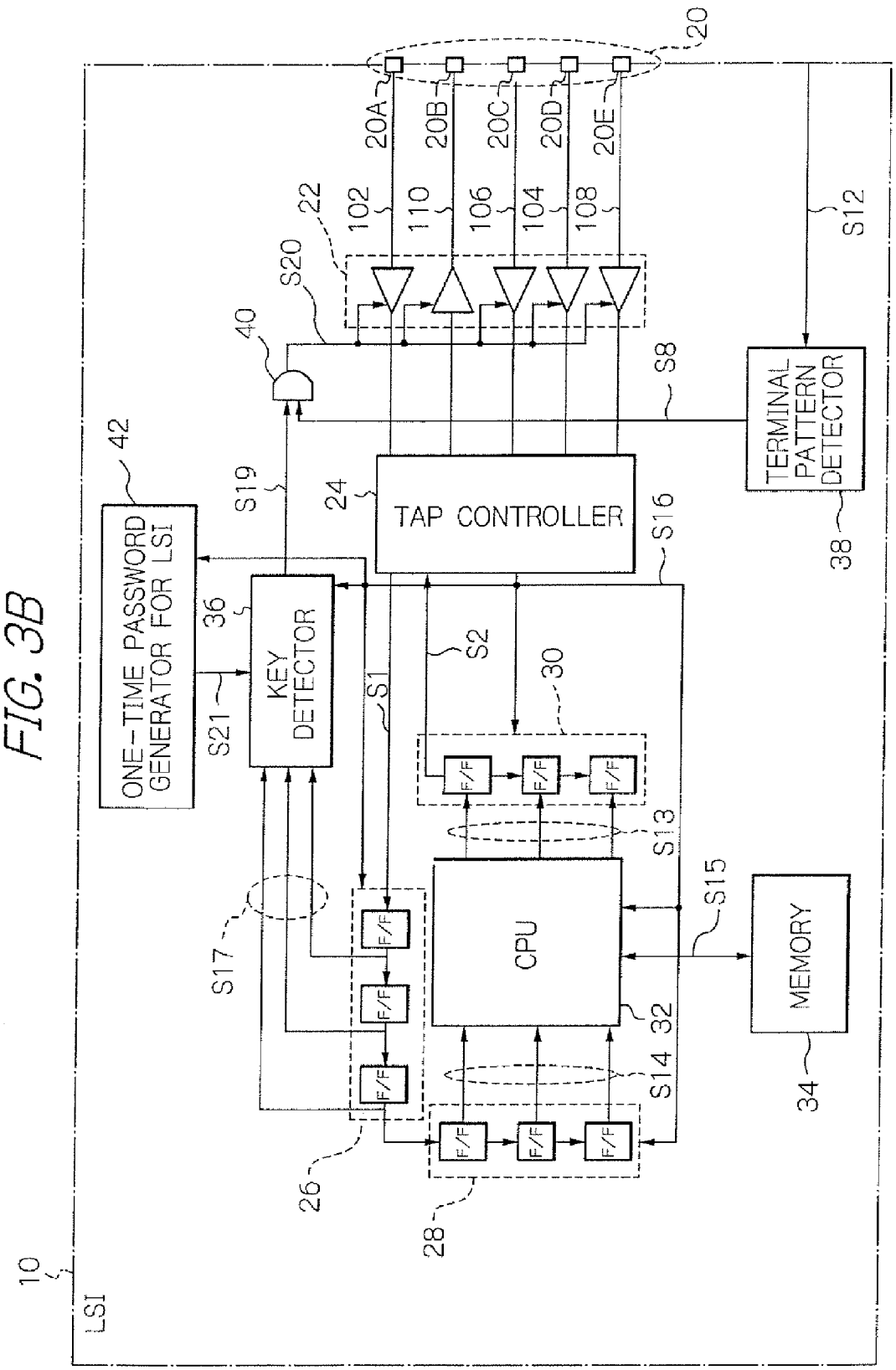

With reference to FIG. 3B also, the system LSI 10 in accordance with the alternative embodiment further includes a one-time password generator 42 for LSI.

The one-time password generator 42 for LSI stores a first cipher value, and performs a predetermined arithmetical operation on the first cipher value to produce a password. The one-time password generator 42 is connected to the TAP controller 24 to receive the debug control signal S16, and updates, when the debug control signal S16 representing "run" is inputted, the first cipher value to generate a new password. The generated password is outputted to the key detector 36 as a password signal S21.

The key detector 36 in accordance with the alternative embodiment compares, when the inputted debug control signal S16 represents "run", the password represented by the key data signal S17 with the password represented by the password signal S21, and switches the key pattern enable signal S19 to its negate state in case the passwords do not match each other.

Correspondingly, the ICE 12 in accordance with the alternative embodiment further includes a one-time password generator 58 for ICE, as shown in FIG. 3A.

The one-time password generator 58 for ICE stores a second cipher value, and performs a predetermined arithmetical operation on the second cipher value to produce a password. The one-time password generator 58 updates, when a run occurrence signal S20 is inputted, the second cipher value to generate a new password.

In accordance with the alternative embodiment, the command generator 52 outputs, when outputting the JTAG command representing "run", the run occurrence signal S20 to the one-time password generator 58 for ICE.

In the one-time password generator 42 for LSI and the one-time password generator 58 for ICE in accordance with the alternative embodiment, the first and second cipher values, respectively, are initially set to one and the same predetermined value as the default values thereof. In addition, in the one-time password generators 42 and 58, the predetermined arithmetical operations to be performed to update the first and second cipher values, respectively, are the same as each other. In the one-time password generators 42 and 58, the predetermined arithmetical operations to be performed to generate the passwords from the first and second cipher values, respectively, are also the same as each other.

Next, the operation of the system LSI 10 in accordance with the alternative embodiment will be described. The following will be described to take an exemplified case where the personal computer 14 reads out twice data stored in the memory 34 provided for the system LSI 10.

In the same manner as stated above with reference to FIGS. 1A and 1B, when the system LSI 10 in accordance with the alternative embodiment reads out data through the JTAG port 20, the system LSI 10 handles the input state for the predetermined general-purpose port as the predetermined pattern and enables the JTAG port 20 at the start of supplying the power for driving with the system LSI 10.

When the JTAG port 20 is enabled, the personal computer 14 outputs a read command to the host interface 50 to direct twice reading out data from the memory 34.

In the ICE 12, the command generator 52 interprets the command inputted from the host interface 50, generates the JTAG signals for performing the command, and outputs the JTAG signals in order. The ICE 12 in accordance with the alternative embodiment also outputs the JTAG command, e.g. as shown in FIG. 4 in the order the JTAG shift command C21 (first read), the JTAG run command C22 (first read), the JTAG capture command C23 (first read), the JTAG shift command C24 (first read/second read), the JTAG run command C25 (second read) r the JTAG capture command C26 (second read), the JTAG shift command C27 (second read), so as to read out data twice from the memory 34. The one-time password generator 58 for ICE outputs a password signal S22 representing a password A generated on the basis of the first cipher value to the command generator 52.

The ICE 12 outputs the TMS signal 106 representing the JTAG shift command C21, and attaches the password data A represented by the password signal S22 to the end of the data representing the read command to the CPU 32 to output the TDI signal 102, refer to P1 in FIG. 4.

The TAP controller 24, when receiving the TMS signal 106 representing the JTAG shift command C21 through the input/output tri-state circuit 22, as stated above, outputs the TDI signal 102 as the inside TDI signal SI, outputs the debug control signal S16 representing "shift" the same number of times as the flip-flop circuits in the key data cell 26 and the input data cell 28, and shifts the data represented by the inside TDI signal S1 to the key data cell 26 and the input data cell 28.

Thus, each flip-flop circuit in the key data cell 26 latches data representing the password A, and each flip-flop circuit in the input data cell 28 latches data representing the read command to the CPU 32.

Next, the ICE 12 outputs the TM signal 106 representing the JTAG run command C22. At that moment, the one-time password generator 58 for ICE receives the run occurrence signal S20 from the command generator 52 to update the first cipher value, and outputs the password signal S22 representing a new password B to the command generator 52. That is, the run command triggers an update of the password, refer to P2 in FIG. 4. The password data B represented by the password signal S22 is attached to the TDI signal 102 to output when the JTAG shift command C24 is handled as described below, refer to P3 in FIG. 4.

The TAP controller 24, when the TMS signal 106 representing the JTAG run command C22 is inputted through the input/output tri-state circuit 22, outputs the debug control signal S16 representing "run".

Thus, the data latched by each flip-flop circuit in the input data cell 28 is outputted as the debug input signal S14 to the CPU 32, and the data latched by each flip-flop circuit in the key data cell 26 is outputted as the key data signal S17 to the key detector 36.

The CPU 32 interprets the command represented by the data inputted from the input data cell 28, reads out the data from the memory 34 depending upon a result of the interpreting, and outputs the read out data as the debug output signal S13.

Also, the one-time password generator 42 for LSI outputs the password signal S21 representing a password A' generated on the basis of the second cipher value to the key detector 36.

The key detector 36 compares the password A represented by the key data signal S17 with the password A' represented by the password signal S21, reflects the comparison result to the key pattern enable signal S19, and herein switches, when the passwords do not match each other, the key pattern enable signal S19 to its negate state, refer to P4 in FIG. 4.

Thus, when the passwords do not match each other, the key pattern enable signal 519 outputted from the key detector 36 turns to its negate state, and as a result, the input/output tri-state circuit 22 is disabled to cut off the JTAG port 20 because the enable signal S20 outputted from the AND gate 40 turns to its negate state.

By contrast, when the passwords match each other, the enable signal S20 outputted from the AND gate 40 holds its assert state because the key pattern enable signal S19 holds its assert state.

In addition, the one-time password generator 42 for LSI receives the debug control signal 516 representing "run" to update the second cipher value, and outputs the password signal S21 representing the new password B' to the key detector 36. That is, the run command triggers the update of the password, refer to P5 in FIG. 4.

Next, the ICE 12 outputs the TMS signal 106 representing the JTAG capture command C23.

The TAP controller 24 outputs, when the TMS signal 106 representing the JTAG capture command C23 is inputted through the input/output tri-state circuit 22, the debug control signal S16 representing "capture".

Thus, the output data cell 30 latches the debug output signal S13.

Next, the ICE 12 outputs the TMS signal 106 representing the JTAG shift command C24, and attaches the password data B represented by the password signal S22 to the end of the data representing the second read command to the CPU 32 to output the TDI signal 102. That is, the run command triggers the update of the password, refer to P3 in FIG. 4.

The TAP controller 24, when the TMS signal 106 representing the JTAG shift command C24 is inputted through the input/output tri-state circuit 22, outputs the TDI signal 102 inputted through the input/output tri-state circuit 22 as the inside TDI signal S1 in order, and the debug control signal S16 representing "shift" in sync with outputting the inside TDI signal S1 the same number of times as the flip-flop circuits in the key data cell 26 and the input data cell 28.

Thus, the data latched by each flip-flop circuit in the output data cell 30 is outputted as the inside TDO signal S2 to the TAP controller 24, and outputted as the TDO signal 110 to the ICE 12 through the TAP controller 24.

At the same time, each flip-flop circuit in the key data cell 26 latches the data representing the password B, and each flip-flop circuit in the input data cell 28 latches data representing the second read command to the CPU 32.

Next, the ICE 12 outputs the TMS signal 106 representing the JTAG run command C25.

The TAP controller 24 outputs, when the TMS signal 106 representing the JTAG run command C25 is inputted through the input/output tri-state circuit 22, the debug control signal S16 representing "run".

Thus, the data latched by each flip-flop circuit in the input data cell 28 is outputted as the debug input signal S14 to the CPU 32, and the data latched by each flip-flop circuit in the key data cell 26 is outputted as the key data signal S17 to the key detector 36.

The CPU 32 interprets the command represented by data inputted from the input data cell 28, reads out the data from the memory 34 depending upon a result of the interpreting, and outputs the read out data as the debug output signal S13.

Also, the key detector 36 compares the password B represented by the key data signal S17 with the password B' represented by the password signal S21, reflects the comparison result to the key pattern enable signal S19, and herein switches, when the passwords do not match each other, the key pattern enable signal S19 to its negate state, refer to P6 in FIG. 4.

At that moment, the password B' represented by the password signal S21 is the password updated according to the first readout as stated above, and the key data signal S17 is the password B updated according to the first readout as stated above. Therefore, the password represented by the key data signal S17 and the password represented by the password signal S21 match each other, the key pattern enable signal S19 is kept its assert state, and as a result, the enable signal S20 is kept the assert state.

Now, if the password represented by the key data signal S17 and the password represented by the password signal S21 do not match each other, the key pattern enable signal S19 turns to its negate state, and as a result, the input/output tri-state circuit 22 is disabled to cut off the JTAG port 20 because the enable signal S20 outputted from the AND gate 40 turns to its negate state.

The one-time password generator 42 for LSI receives the debug control signal S16 representing "run" to update the second cipher value, and outputs the password signal S21 representing a new password C' to the key detector 36. That is, the run command triggers the update of the password, refer to P7 in FIG. 4.

Next, the ICE 12 outputs the TMS signal 106 representing the JTAG capture command C26.

The TAP controller 24 outputs, when the TMS signal 106 representing the JTAG capture command C26 is inputted through the input/output tri-state circuit 22, the debug control signal S16 representing "capture".

Thus, the output data cell 30 latches the debug output signal S13.

Next, the ICE 12 outputs the TMS signal 106 representing the JTAG shift command C27.

The TAP controller 24, when the TMS signal 106 representing the JTAG shift command C27 is inputted through the input/output tri-state circuit 22, outputs the debug control signal S16 representing "shift" the same number of times as the flip-flop circuits in the output data cell 30.

Thus, the data latched by each flip-flop circuit in the output data cell 30 is outputted as the inside TDO signal S2 to the TAP controller 24, and outputted as the TDO signal 110 to the ICE 12 through the TAP controller 24.

As stated above, the system LSI 10 and the ICE 12 of the alternative embodiment can thus heighten advantageously its security effect because the password is updated every time the run command is performed.

Both of the illustrative embodiments stated above have the input/output tri-state circuit 22 adapted to cut off all of the JTAG signals, but the present invention is not to be restricted by the specific embodiments. The system may be structured such that only some of the signals are cut off, or, for example, only one of the TDI signal 102 and the TDO signal 110 are cut off. Such cases have the same advantages as the illustrative embodiments as well.

In addition, the illustrative embodiments stated above is adapted to attach the password data to the end of data representing the read command, but the present invention is not to be restricted by the specific embodiments. For example, password data may be attached to any position as long as it is integrated. In this case, data may be extracted from a portion corresponding to the password data for comparison, depending upon the extracting position. This case has also the same advantages as the illustrative embodiments as well.

The illustrative embodiments stated above have the input/output tri-state circuit 22 adapted to cut off the JTAG signals, but the present invention is not to be restricted by the specific embodiments. For example, the TAP controller 24 maybe disabled to cutoff the transfer. This case also attains the same advantages as the illustrative embodiments as well.

In addition, the alternative embodiment stated above has passwords generated on the basis of the same value stored in the one-time password generator 42 for LSI and the one-time password generator 58 for ICE, but the present invention is not to be restricted by the specific embodiment. For example, a circuit holding the time may be provided for each of the one-time password generators 42 and 58 to synchronize the time with each other, and passwords may be generated on the basis of the time. This case also has the same advantages as the illustrative embodiments as well.

The configuration of the system LSI 10 and the ICE 12 described with reference to FIGS. 1A, 1B, 3A and 3B of the illustrative embodiments is only illustrative. The system LSI 10 and the ICE 12 may be configured suitably so far as not deviating from the spirit and scope of the prevent invention.

The format of the JTAG command described with reference to FIGS. 2 and 4 is only illustrative. The JTAG command may be arranged suitably so far as not deviating from the spirit and scope of the prevent invention.

The entire disclosure of Japanese patent application No. 2006-355089 filed on Dec. 28, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A semiconductor device comprising:
   an input port to which command information representing a command and password information representing a password is inputted integrally;
   a processor operative in response to the command represented by the command information inputted for performing a process to produce consequence information representative of a consequence of the process;
   an output port outputting the consequence information;
   a transfer section for transferring the command information from said input port to said processor and for transferring the consequence information from said processor to said output port;
   a cutoff section for cutting off at least one of transferring the command information to said processor and transferring the consequence information to said output port when the password represented by the password information inputted does not match a predetermined proper password
   a generator for producing a new password at a predetermined timing; and
   a comparator for comparing the password represented by the password information inputted with the proper password produced by said generator;
   wherein the predetermined timing is defined as time when said processor performs the process in response to a predetermined command.

* * * * *